July 7, 1959 R. P. CROW 2,894,208

FREQUENCY SHIFT TRANSMITTER

Filed Sept. 6, 1955 2 Sheets-Sheet 1

INVENTOR.
Robert P. Crow
BY
Mueller & Aichele
Att'ys.

INVENTOR.
Robert P. Crow
BY Mueller & Aichele
Attys.

United States Patent Office 2,894,208
Patented July 7, 1959

2,894,208

FREQUENCY SHIFT TRANSMITTER

Robert P. Crow, Park Ridge, Ill., assignor to Motorola, Inc., Chicago, Ill., a corporation of Illinois Application September 6, 1955, Serial No. 532,691

8 Claims. (Cl. 331—40)

The present invention relates to a transmitter for use in a frequency-shift communication system and more particularly to a transmitter that is constructed for use in power line carrier equipment.

Frequency shift power line carrier equipment is designed to utilize the carrier spectrum of a power line to transmit intelligence from a central station to various substations over the power line interconnecting these stations. This spectrum usually extends from about 40–200 kilocycles. At present, complex communication systems of this type have grown up and are used by the electric power industry to control the vast network of electrical generating, transmission and power distribution facilities that exist today. Many types of operations are performed by this equipment including, for example, remote signaling and indication, protective relaying, telemetering, and other keyed or telegraphic message transmissions such as load control, supervisory control and teleprinting. The equipment may also be used for voice communication.

The large variety of controls and intelligence which are desired to be communicated over power line carrier equipment has led to a crowding of the available spectrum and this has created the need for equipment that uses a minimum of band width for each signal channel. In addition to this, it is desirable that the equipment provides a uniform band width for each channel rather than one that is dependent on the carrier frequency so that a maximum amount of information can be transmitted in a given spectrum.

It is, accordingly, an object of the present invention to provide an improved frequency-shift transmitter suitable for operation in a frequency band of approximately 40–200 kilocycles, and of utilizing a channel spacing of the order of 500 cycles for transmitting desired intelligence, and which band width is independent of the carrier frequency of the transmitter.

A more general object is to provide an improved transistorized transmitter of the frequency-shift type.

Yet another object of the invention is to provide an improved transistor-type frequency-shift transmitter capable of efficient operation in a relatively low frequency band and of transmitting intelligence with a uniform relatively narrow channel band width in such a band.

A feature of the invention is the provision of a frequency-shift transmitter which includes a pair of crystal stabilized transistor oscillators that provide relatively high frequency signals that are heterodyned to a relatively low frequency operating band, thus enabling the oscillator to operate at a sufficiently high frequency for optimum crystal stabilization and modulation control and to permit a standard narrow channel band width independent of carrier frequency within the band.

Another feature is the provision of such a transmitter which includes a modulator that responds either to changes in an external contact condition or to an applied signal to switch additional capacitance into the frequency determining circuit of one of the oscillators by controlling the bias on at least one diode switching device.

Yet another feature is the provision of such a transmitter in which the modulator includes a pair of diode switching circuits to establish three distinct stable frequencies of the oscillator in response to changes in an external contact condition.

The above and other features of the invention which are believed to be new are set forth with particularity in the appended claims. The invention itself, however, together with further objects and advantages thereof, may best be understood by reference to the following description when taken in conjunction with the accompanying drawings in which:

Figure 2A:
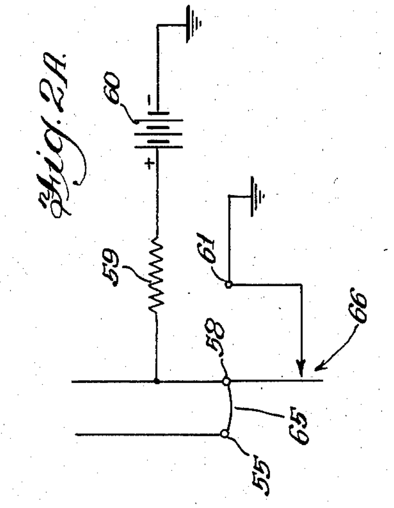
Fig. 2 is a detailed circuit representation of the invention.
Figure 2B:
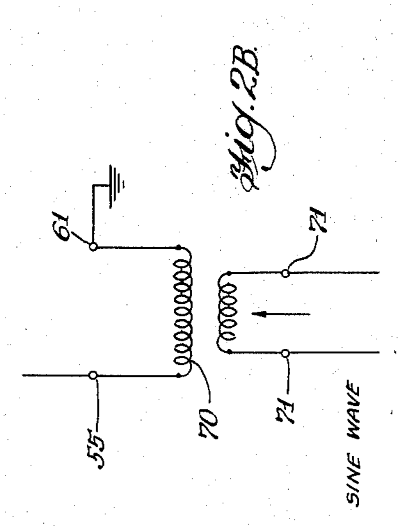
Figure 2:
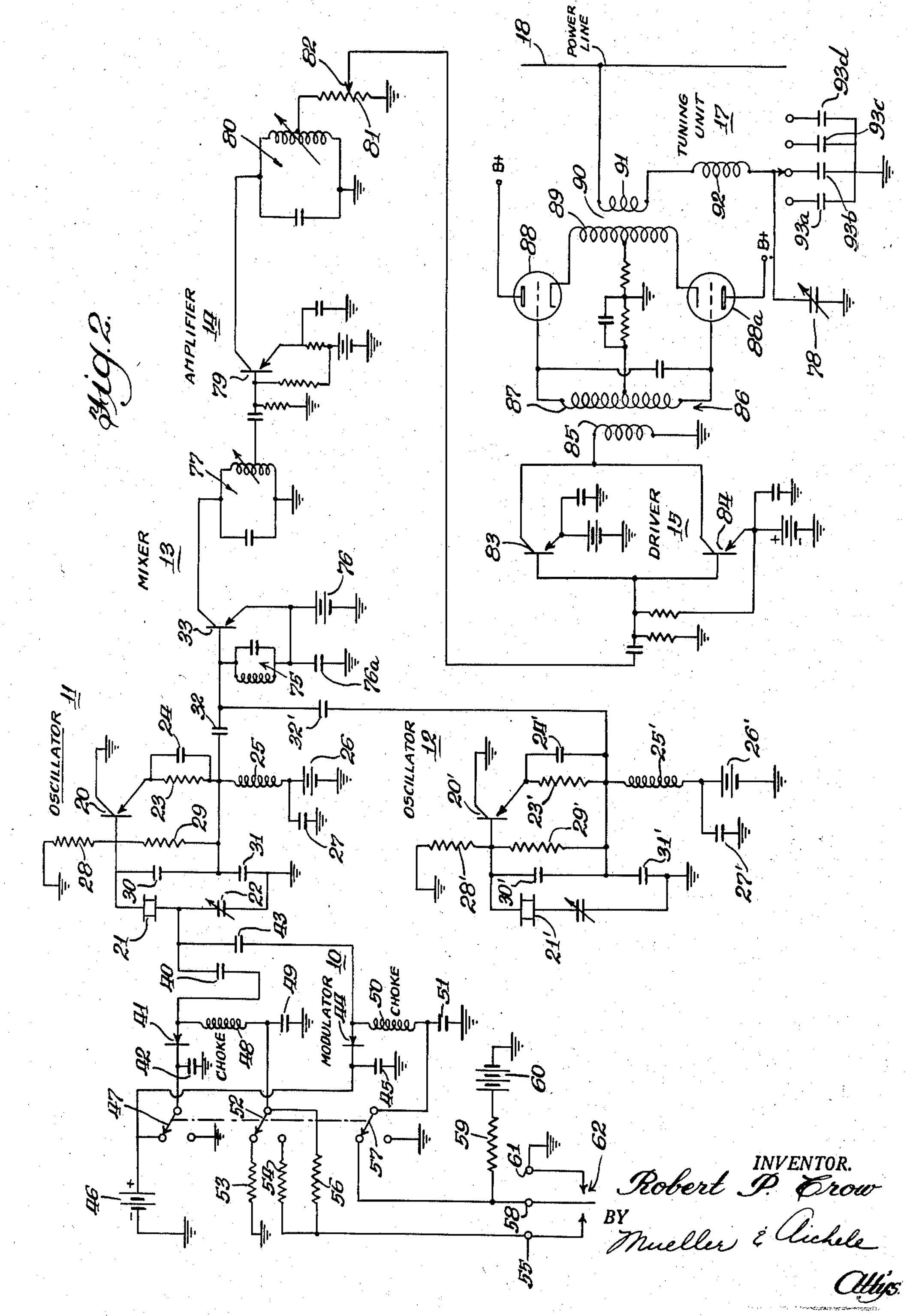

Figs. 2*a* and 2*b* are fragmentary modifications of the system of Fig. 2.

The present invention provides a frequency shift transmitter comprising a first transistor oscillator which includes a frequency determining circuit having a piezoelectric crystal and a series-connected capacitor therein, which oscillator develops a first signal of a selected frequency. The transmitter also includes a second crystal controlled transistor oscillator for developing a second signal of a different selected frequency, with the frequency of the first signal differing from the frequency of the second signal by an amount small as compared with the individual frequencies of the signals. A mixer is coupled to the oscillators for heterodyning the first and second signals to produce a third signal having a frequency corresponding to the difference between the frequencies of the first and second signals, and means is provided for transmitting the third signal to a remote point. The transmitter further includes a capacitor and it includes switching means including a diode for connecting the capacitor across the series-connected capacitor in the frequency determining circuit of the first oscillator so as to shift the frequency of the first oscillator from the selected frequency to a second frequency. Finally, means is provided for controlling the diode between a conductive and a nonconductive state to effect the aforesaid shift of the frequency of the first oscillator.

The frequency shift power line carrier equipment of the present invention is designed to transmit either of two basic types of information: (1) the frequency of an input sine wave signal, or (2) the status of a set of external contacts such as a pair of contacts of a 2 or 3-position contact arrangement. Some types of telemetering and control devices using the frequency of a sine wave signal to transfer information and the transmitter must produce a sine wave output which varies in frequency according to the information to be transmitted. This sine wave is used to frequency modulate a radio-frequency carrier for transmission over the power line. In the second type, the transmitter must be constructed to translate each contact position into a specific stable carrier frequency. That is, a change in contact position causes a change in transmitter frequency from one stable frequency to another. In the latter arrangement, open-close contacts can be used to transmit simple "on-off" information such as remote signaling and indication; or more complex information can be transmitted by varying the impulse rate, duration count, or code group of the resulting pulses. With the single-pole-double-throw (center neutral) arrangement, the elements of information can be sent such as "lower-neutral-raise" control of a distant generator, motor, or the like.

Figure 1:
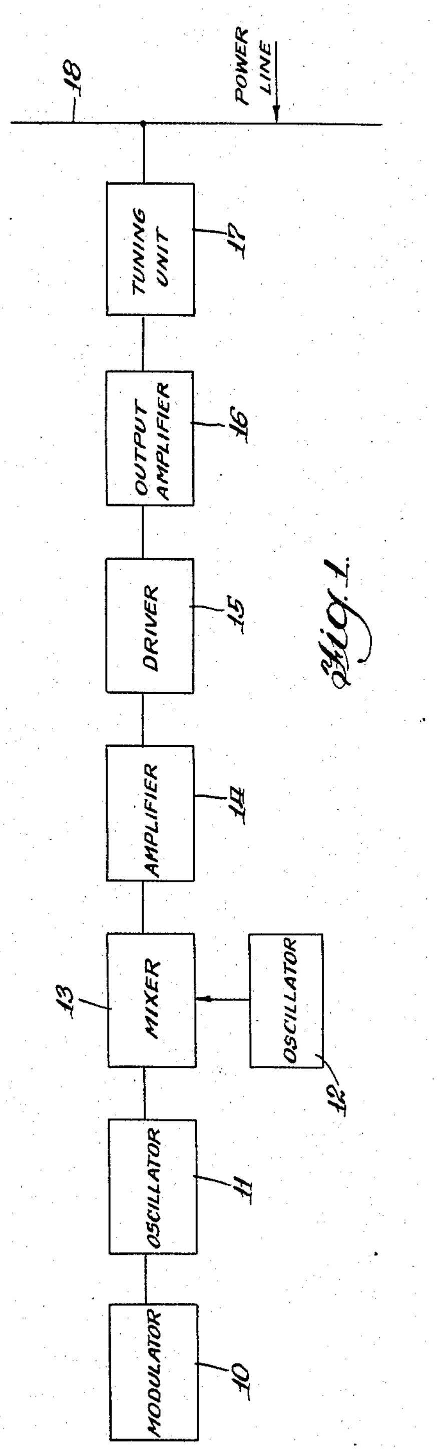
Fig. 1 is a block diagram of the frequency shift transmitter of the present invention.

A block representation of the power line transmitter of the present invention is shown in Fig. 1. Basically, the transmitter consists of a modulator 10, a frequency modulated oscillator 11, a fixed frequency oscillator 12, a mixer 13, an amplifier 14, a driver 15 and an output amplifier 16.

The two oscillators 11, 12 operate, for example, at approximately two megacycles and are heterodyned in mixer 13 to produce a carrier frequency in the 40–200 kilocycle range of the power line medium. Oscillator 11 is preferably constructed to have a center frequency of two megacycles and is frequency-modulated by modulator 10 in the order of ±100 cycles. Oscillator 12, on the other hand, is constructed to operate at a selected fixed frequency of 40–200 kilocycles above 2.0 megacycles. This type of arrangement permits the same modulation frequency deviation at any carrier frequency in the 40–200 kilocycle band and also permits optimum oscillator operation.

Modulator 10 is equipped with manually operated switch to provide a choice of the contact type input or sine wave input, as discussed above. The transmitter translates each contact position of the contact type input into a specific carrier frequency, and a sine wave input frequency modulates the transmitter carrier. The modulator includes two diodes in series with respective fixed capacitors. These capacitors are added to the modulated oscillator circuit only when the diodes are conductive, and the frequency of the oscillator varies with each added capacitor. The diodes, and hence the oscillator frequency, are controlled by a bias voltage which is either an input sine wave voltage or an internal voltage applied by external contacts, depending upon the position of the above mentioned switch.

A two-position open-close contact input shifts the transmitter frequency 100 cycles above center frequency and 100 cycles below center frequency by applying two voltages that either cut off both diodes or cause both to conduct. Each diode is biased to conduct on the saturated part of its characteristic curve so that component aging supply voltage variations have negligible effect on the oscillator frequency.

A single-pole-double-throw center-neutral contact input shifts the transmitter carrier frequency between 100 cycles below center frequency, center frequency, and 100 cycles above center frequency. Center frequency is obtained by biasing one diode to a stable rate of conduction and biasing the other diode to cut-off. The upper frequency is obtained by biasing both diodes to cut-off, and the lower frequency is obtained by biasing both diodes to a saturated conductive state. A sine wave input voltage is applied directly to one of the diodes to vary the oscillator frequency accordingly.

Both oscillators 11 and 12 are crystal controlled and temperature compensated. A variable capacitor is included in series with the crystal in each oscillator to permit adjustment of the oscillator frequency. Both crystals may be included in a single oven to maintain substantially constant crystal temperature for variation in ambient temperature. The arrangement permits the oscillators to be operated at a sufficiently high frequency for convenient crystal control and practical modulation of the frequency thereof.

The output of the two oscillators 11, 12 are mixed in mixer 13 to obtain a difference frequency in the 40–200 kilocycle band. The resulting signal is amplified in amplifier 14. The mixer 13 and amplifier 14 are of the transistor type and each contain a high quality factor (Q) permiability-tuned circuit for maximum harmonic attenuation. A potentiometer is incorporated in the output circuit of amplifier 14 to control the output level of the transmitter.

Driver 15 includes two transistors in parallel to drive the output amplifier 16. The output amplifier includes two electron discharge devices connected as cathode followers in push-pull to provide an output with minimum harmonic distortion. With the exception of these two electron discharge devices in the output amplifier, the entire transmitter is transistorized. The output amplifier is connected to an output transformer with a primary impedance of, for example, 5,000 ohms and a secondary impedance of 50 ohms.

The output amplifier 16 is coupled to the power line 18 through a tuning unit 17. This unit comprises a series tuned, high-quality factor (Q), inductance-capacitance circuit which is connected in series with the transmitter output. The tuning unit has low insertion loss at the transmitter frequency and high impedance at other frequencies. The unit provides further harmonic attenuation in the transmitter output and minimizes loading effects on other transmitters connected to the same power line. This arrangement incorporates the teaching of copending application S.N. 446,493 filed July 28, 1954 in the name of Robert P. Crow, and assigned to the present assignee.

As shown in the circuit diagram of Fig. 2, oscillator 11 includes a transistor 20 which is connected as a modified Colpitts oscillator with its collector being connected to a point of reference potential or ground and forming the common return electrode. The base electrode is connected to a piezo-electric crystal 21 which is connected to ground through a variable capacitor 22. The emitter electrode is coupled through a biasing resistor 23 and a choke coil 25 to the positive terminal of a source of unidirectional biasing potential 26, the resistor being shunted by a capacitor 24. The negative terminal of source 26 is connected to ground, and the source is by-passed by a capacitor 27. The collector is connected to ground. An appropriate D.C. bias is provided to the base by resistors 28 and 29, which are connected as a potentiometer across choke coil 25 and source 26. This potentiometer, together with the biasing resistor 23, assure that the proper biasing potentials are applied to the electrodes of the transistor 20 despite temperature or other variations in the parameters of the circuit. To sustain oscillation in the circuit, a pair of capacitors 30 and 31 is connected in series across crystal 21 and variable capacitor 22. The common junction of capacitors 30, 31 is returned to the junction of resistor 23 and choke coil 25. With this arrangement, the emitter functions as an output electrode for the oscillator and supplies a signal across capacitor 31 in the proper phase to sustain oscillation in the circuit. The output signal from oscillator 11 is impressed through a capacitor 32 on the base electrode of a transistor 33 in mixer circuit 13.

The circuit of oscillator 12 may be similar to that of oscillator 11, and the like components in the two circuits are represented by like numerals, with those in oscillator 12 being primed. As previously noted, oscillator 11 may, for example, have a center frequency of 2 megacycles and is modulated in a manner to be described. Oscillator 12, on the other hand, has a frequency in the vicinity of 2 megacycles but differing therefrom by a predetermined amount so that the resulting difference signal produced by mixer 13 may have any predetermined position in the power line frequency band.

A capacitor 40, diode 41 and a by-pass capacitor 42 are series connected in that order across the variable capacity 22 in the frequency determining circuit of oscillator 11. In addition, a capacitor 43, a diode 44 and a by-pass capacitor 45 are connected in that order across the variable capacitor 22. When diode 41 is rendered conductive, additional capacitance is inserted in the frequency determining circuit of oscillator 11 so as to lower the frequency thereof an amount dependent upon the capacitance of capacitor 40. Likewise, when diode 44 is conductive, capacitor 43 is inserted into the oscillator circuit and lowers the frequency of oscillator 11 by an amount determined by the capacitance of this capacitor.

Diodes 41 and 44 are held in a nonconductive state by a positive unidirectional potential source 46 whose negative terminal is connected to ground and whose positive terminal is connected to diode 41 through a single-pole-double-throw switch 47, and which positive terminal is directly connected to diode 44. Switch 47 has a movable arm connected to diode 41, a first contact connected to the positive terminal of source 46 and a second contact connected to ground.

The other side of diode 41 is connected to ground through a choke 48 and capacitor 49, and the other side of diode 44 is connected to ground through a choke 50 and capacitor 51. The common junction of choke 48 and capacitor 49 is connected to the movable arm of a switch 52. Switch 52 has a first contact connected through a resistor 53 to ground and a second contact connected through a resistor 54 to a terminal 55. The common junction of choke 48 and capacitor 49 is also connected to terminal 55 through a resistor 56.

The common junction of choke 50 and capacitor 51 is connected to the movable arm of a switch 57, this switch having a first contact connected to a terminal 58 and a second contact connected to ground. Terminal 58 is connected through a resistor 59 to the positive terminal of a unidirectional potential source 60, the negative terminal of this source being connected to ground. Associated with terminals 55 and 58 is a terminal 61 which is grounded.

In the embodiment of Fig. 2, terminals 55, 58 and 61 are connected to a keying or contact device 62 of the single-pole-double-throw type having a movable arm connected to terminal 58 and a pair of contacts connected respectively to terminals 55 and 61. The movable arm has a central neutral position, and may be shifted in either direction to connect terminal 58 to terminal 55 or to terminal 61.

Switches 47, 52 and 57 are mechanically coupled for uni-control and are moved to their upper illustrated position when the system is used in conjunction with the three position contact keying device 62. With the switches in their upper position, and with the movable arm of contact device 62 in its central or neutral position, the voltage from source 46 is impressed on diodes 41 and 44 tending to block these diodes. However, an opposing voltage from source 60 which is greater than the voltage from source 46 is impressed on diode 44 through resistor 59, switch 57 and choke 50, so that diode 44 is rendered conductive. This effectively places capacitor 43 across variable capacitor 22 in the frequency determining circuit of oscillator 11 so as to lower the oscillator frequency by, for example, 100 cycles to its center frequency position. Then, when the movable arm of key 62 is moved to the right, the potential from source 60 is short-circuited to ground and removed from diode 44, so that both diode 44 and diode 41 are blocked by the voltage from source 46. This causes the oscillator frequency to rise, for example, 100 cycles above center frequency to one modulated position. On the other hand, when the movable arm of key 62 is moved to the left it places the voltage from source 60 on diode 41 through resistor 56 and choke 48 so as to oppose and overcome the voltage from source 46. This causes both diodes 41 and 44 to be conductive so that the capacitors 40 and 43 are placed across variable capacitor 22 to move the oscillator frequency 100 cycles, for example, below center frequency to its lower modulated position. Thus, by shifting the movable arm of key 62 from its neutral position to the right or to the left, the oscillator 11 takes on three distinct frequencies.

As shown in Fig. 2*a*, the system of Fig. 2 can be conditioned for operation by an open-close contact key instead of the three position contact arrangement 62. This conversion is achieved when placing a jumper 65 between terminals 55 and 58 and connecting a single-pole-single-throw key 66 between terminals 58 and 61. Actuation of key 66 causes both diodes either to be conductive or nonconductive and causes the oscillator frequency to shift 200 cycles, for example, from its lowest to its highest value.

For sine wave operation, the switches 47, 52 and 57 are moved to their lower postion, and key 62 is replaced by the arrangement of Fig. 2*b*. This latter arrangement includes a transformer 70 whose secondary winding is connected to terminals 55 and 61 respectively. A sine wave is impressed on the primary winding by way of terminals 71. This connection causes diode 44 to be blocked because switch 57 places ground potential on one of its electrodes and source 46 biases this diode to cut-off. One electrode of diode 41 is connected to ground through switch 47, and the sine wave is impressed across resistor 54 and resistor 56 in parallel on the other electrode of the diode. This causes the sine wave to drive diode 41 between its conductive and non-conductive conditions so that capacitor 40 is connected into the oscillator circuit at the frequency of the sine wave to cause the frequency of the oscillator to vary in accordance with the sine wave so as to be effectively modulated thereby.

The transistor 33 of mixer 13 has its base electrodes connnected to ground through a parallel resonant inductive-capacitance input circuit 75 and through a by-pass capacitor 76. The emitter electrode of transistor 33 is connected to the positive terminal of a suitable biasing source 76 which is shunted by the capacitor 76*a*. The collector electrode of transistor 33 is connected to ground through a parallel-resonant inductance-capacitance tuned circuit 77. Circuit 77 is tuned to the difference frequency of oscillators 11 and 12, so that a frequency-difference heterodyne signal in the band of the power line medium is impressed on transistor 79 in amplifier 14.

Transistor 79 is connected in known manner as a grounded emitter amplifier, and its collector is connected to ground through a parallel tuned inductance-capacitance resonant network 80 of high quality factor (Q). A potentiometer resistor 81 is connected to a tap on the inductive portions of circuit 80 for impedance matching purposes, and a variable tap 82 on the potenitiometer is connected to a pair of transistors 83, 84 connected in parallel in driver 15. As previously noted, the variation of tap 82 on potentiometer 81 controls the output level of the transmitted signal. The transistors 83 and 84 are connected in a grounded emitter arrangement, and their parallel connected collectors are connected to ground through the primary winding 85 of a transformer 86.

The secondary winding 87 of transformer 86 is connected to the control grid of respective electron discharge devices 88 and 88*a*, which are connected in a push-pull cathode-follower arrangement, with the cathodes of these devices being connected to the primary winding 89 of an output transformer 90. The output transformer has a secondary winding 91 of which one side is connected to the power line 18 and the other side is connected to ground through tuning unit 17. The tuning unit includes an inductance coil 92 which is connected to the movable arm of a selector switch so that it may be selectively coupled through a selected one of capacitors 93*a*–93*d* to ground. This forms a series-resonant circuit tuned to a certain frequency so that the secondary winding is effectively terminated only at the selected frequency of the output signal, and other signal frequencies are attenuated thereby. A variable capacitor 78 is connected between coil 92 and ground for high frequencies and to form a vernier at low frequencies.

The invention provides, therefore, a frequency-shift transmitter in which relatively low frequency operation is obtained by crystal-controlled transistor oscillators for narrow band standard frequency deviation operation, and which oscillators are conveniently modulated by controlling the bias in a diode-capacitor circuit so that desired information can be transmitted by this system.

I claim:

1. A frequency-shift transmitter including in combination, a first transistor oscillator including a frequency-determining circuit having a piezo-electric crystal and a series-connected capacitor therein, said first oscillator developing a first signal of a selected frequency, a second crystal-controlled transistor oscillator for developing a second signal of a different selected frequency, with the frequency of said first signal differing from the frequency of said second signal by an amount small as compared with the individual frequencies of said signals, a mixer for heterodyning said first and second signals to produce a third signal having a frequency corresponding to the difference between the frequencies of said first and second signals, means for transmitting said third signal to a remote point, first and second capacitors, first switch means including a diode for connecting said first capacitor across said series-connected capacitor in said frequency-determining circuit to shift the frequency of said first oscillator from said selected frequency to a second frequency, second switch means including a diode for connecting said second capacitor across said series-connected capacitor to shift the frequency of said first oscillator to a third frequency, and contact means for controlling the conductivity of said diodes between conductive and non-conductive states selectively to control the frequency of said oscillator between said selected frequency and said second and third frequencies.

2. The transmitter defined in claim 1 in which said contact means has a neutral position in which one of said diodes only is conductive, in which said contact means has a first position in which both of said diodes are conductive, and in which said contact means has a second position in which both of said diodes are non-conductive.

3. A frequency shift transmitter including in combination, a first oscillator for developing a first signal of a selected frequency, a second oscillator for developing a second signal of a different selected frequency, with the frequency of said first signal differing from the frequency of said second signal by an amount small as compared with the individual frequencies of said signals, a mixer for heterodyning the first and second signals to produce a third signal having a frequency corresponding to the difference between the frequencies of said first and second signals, capacitor means, circuit means including a diode for selectively connecting said capacitor means into the circuit of said first oscillator to shift the frequency of the same, an amplifier for said third signal coupled to said mixer and including a pair of electron discharge devices connected in push-pull and each including a cathode, an output transformer having a primary winding connected to said cathodes and having a secondary winding, and means coupling said secondary winding to a wire line for transmitting said third signal to a remote point.

4. The transmitter defined in claim 3 which further includes a driver stage interposed between said mixer and said amplifier and including a pair of transistors connected in parallel.

5. The transmitter defined in claim 3 in which said last-named coupling means includes a series-resonant tuning unit connected in series with said secondary winding of said output transformer.

6. The transmitter defined in claim 3 in which said secondary winding has an apparent low impedance as compared with the impedance of said primary winding to attenuate external stray signals.

7. A frequency shift transmitter including in combination, a first oscillator for developing a first signal of a selected frequency, a second oscillator for developing a second signal of a different selected frequency, with the frequency of said first signal differing from the frequency of said second signal by an amount small as compared with the individual frequencies of said signals, a mixer for heterodyning the first and second signals to produce a third signal having a frequency corresponding to the difference between the frequencies of said first and second signals, means for transmitting said third signal to a remote point, capacitor means, circuit means including a diode for selectively connecting said capacitor means into the circuit of said first oscillator to shift the frequency of the same, and means for impressing a sine wave on said last-named circuit means to control the conductivity of said diode and thereby vary the frequency of said first oscillator, and frequency modulate said third signal.

8. A frequency-shift transmitter including in combination, a first transistor oscillator including a frequency-determining circuit having a piezo-electric crystal, said first oscillator developing a first signal of a selected frequency, a second crystal-controlled transistor oscillator for developing a second signal of a different selected frequency, with the frequency of said first signal differing from the frequency of said second signal by an amount small as compared with the individual frequencies of said signals, a mixer for heterodyning said first and second signals to produce a third signal having a frequency corresponding to the difference between the frequencies of said first and second signals, first and second capacitors, first switch means including a diode for connecting said first capacitor in said frequency-determining circuit to shift the frequency of said first oscillator from said selected frequency to a second frequency, second switch means including a diode for connecting said second capacitor in said frequency-determining circuit to shift the frequency of said first oscillator to a third frequency, and means for selectively controlling the conductivity of said diodes between conductive and non-conductive states selectively to control the frequency of said first oscillator and thereby control the frequency of said third signal.

References Cited in the file of this patent

UNITED STATES PATENTS

| | | |
|---|---|---|
| 2,110,082 | Granger | Mar. 1, 1938 |
| 2,291,369 | Boughtwood | July 28, 1942 |
| 2,574,326 | Goldstine | Nov. 6, 1951 |
| 2,636,941 | Singel | Apr. 28, 1953 |
| 2,755,384 | Pierson et al. | July 17, 1956 |